(12) United States Patent
Byrne et al.

(10) Patent No.: US 10,926,714 B2
(45) Date of Patent: Feb. 23, 2021

(54) VEHICLE CAMERA WITH EMI SHIELDING

(71) Applicant: Magna Electronics Inc., Auburn Hills, MI (US)

(72) Inventors: Steven V. Byrne, Goodrich, MI (US); Jonathan D. Conger, Berkley, MI (US); Nazar F. Bally, Sterling Heights, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 165 days.

(21) Appl. No.: 16/185,089

(22) Filed: Nov. 9, 2018

(65) Prior Publication Data
US 2019/0143907 A1    May 16, 2019

Related U.S. Application Data

(60) Provisional application No. 62/584,303, filed on Nov. 10, 2017.

(51) Int. Cl.
| | |
|---|---|
| *H04N 5/225* | (2006.01) |
| *H01R 12/71* | (2011.01) |
| *H01R 24/54* | (2011.01) |
| *B60R 11/04* | (2006.01) |
| *H01R 24/52* | (2011.01) |
| *H01R 12/70* | (2011.01) |

(52) U.S. Cl.
CPC .......... *B60R 11/04* (2013.01); *H01R 12/7076* (2013.01); *H01R 12/716* (2013.01); *H01R 24/52* (2013.01); *H01R 24/542* (2013.01); *H04N 5/2252* (2013.01); *H04N 5/2257* (2013.01); *H04N 5/22521* (2018.08)

(58) Field of Classification Search
CPC ........ B60W 2420/403; B60W 2420/42; B60Y 2400/3015; B60R 11/04; H05K 9/00–0098; H05K 5/00–069; H05K 7/00–2099; H05K 2201/10121; H01L 27/14618; G02B 13/001–009
USPC ................................... 348/374; 361/600–837
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,949,331 A | 9/1999 | Schofield et al. |

(Continued)

*Primary Examiner* — Xi Wang
(74) *Attorney, Agent, or Firm* — Honigman LLP

(57) ABSTRACT

A vehicular camera assembly includes a front housing portion accommodating a lens, a circuit board having an imager and an electrical connecting element at opposite sides thereof, a rear housing portion and an electrical connector. The rear housing portion includes a rear attachment portion that has an aperture therethrough. The electrical connector electrically connects a wire of the vehicle to the electrical connecting element of the circuit board. The electrical connector includes an electrically conductive element that is electrically conductively connected to an outer ground contact of the connector. The rear housing portion includes a shield element having flexible tabs that protrude through the aperture. As the electrical connector is attached at the rear attachment portion, the shield element tabs engage the electrically conductive element to establish and maintain electrically conductive connection between the shield element and the electrically conductive element and the outer ground contact of the connector.

20 Claims, 11 Drawing Sheets

(56) References Cited

U.S. PATENT DOCUMENTS

| | | | |
|---|---|---|---|
| 7,901,215 B1 * | 3/2011 | Galgoci | B60Q 1/0088 307/10.1 |
| 7,965,336 B2 | 6/2011 | Bingle et al. | |
| 8,503,061 B2 | 8/2013 | Uken et al. | |
| 8,542,451 B2 | 9/2013 | Lu et al. | |
| 8,866,907 B2 | 10/2014 | McElroy et al. | |
| 9,041,806 B2 | 5/2015 | Baur et al. | |
| 9,126,525 B2 | 9/2015 | Lynam et al. | |
| 9,233,641 B2 | 1/2016 | Sesti et al. | |
| 9,565,342 B2 | 2/2017 | Sauer et al. | |
| 9,609,757 B2 | 3/2017 | Steigerwald | |
| 10,128,595 B2 | 11/2018 | Conger et al. | |
| 2005/0001901 A1 * | 1/2005 | Eggers | B60R 11/04 348/118 |
| 2006/0171704 A1 * | 8/2006 | Bingle | B60R 11/04 396/419 |
| 2006/0189183 A1 * | 8/2006 | Yang | H01R 13/5025 439/95 |
| 2009/0115891 A1 * | 5/2009 | Ryu | H05K 1/0218 348/374 |
| 2011/0310248 A1 | 12/2011 | McElroy et al. | |
| 2012/0218412 A1 | 8/2012 | Dellantoni et al. | |
| 2013/0222595 A1 | 8/2013 | Gebauer et al. | |
| 2013/0242099 A1 | 9/2013 | Sauer et al. | |
| 2013/0328672 A1 | 12/2013 | Sesti et al. | |
| 2013/0344736 A1 | 12/2013 | Latunski | |
| 2014/0138140 A1 | 5/2014 | Sigle | |
| 2014/0218535 A1 | 8/2014 | Ihlenburg et al. | |
| 2014/0320636 A1 | 10/2014 | Bally et al. | |
| 2014/0340510 A1 | 11/2014 | Ihlenburg et al. | |
| 2014/0362209 A1 | 12/2014 | Ziegenspeck et al. | |
| 2014/0373345 A1 | 12/2014 | Steigerwald | |
| 2015/0042807 A1 | 2/2015 | Ihlenburg et al. | |
| 2015/0222795 A1 | 8/2015 | Sauer et al. | |
| 2015/0266430 A1 | 9/2015 | Mleczko et al. | |
| 2015/0365569 A1 | 12/2015 | Mai et al. | |
| 2016/0037028 A1 | 2/2016 | Biemer | |
| 2016/0268716 A1 | 9/2016 | Conger et al. | |
| 2017/0054881 A1 | 2/2017 | Conger et al. | |
| 2017/0129419 A1 | 5/2017 | Conger et al. | |
| 2017/0133811 A1 | 5/2017 | Conger et al. | |
| 2017/0201661 A1 * | 7/2017 | Conger | H04N 5/2252 |
| 2017/0295306 A1 | 10/2017 | Mleczko | |
| 2017/0302829 A1 | 10/2017 | Mleczko et al. | |
| 2018/0072239 A1 | 3/2018 | Wienecke et al. | |

\* cited by examiner

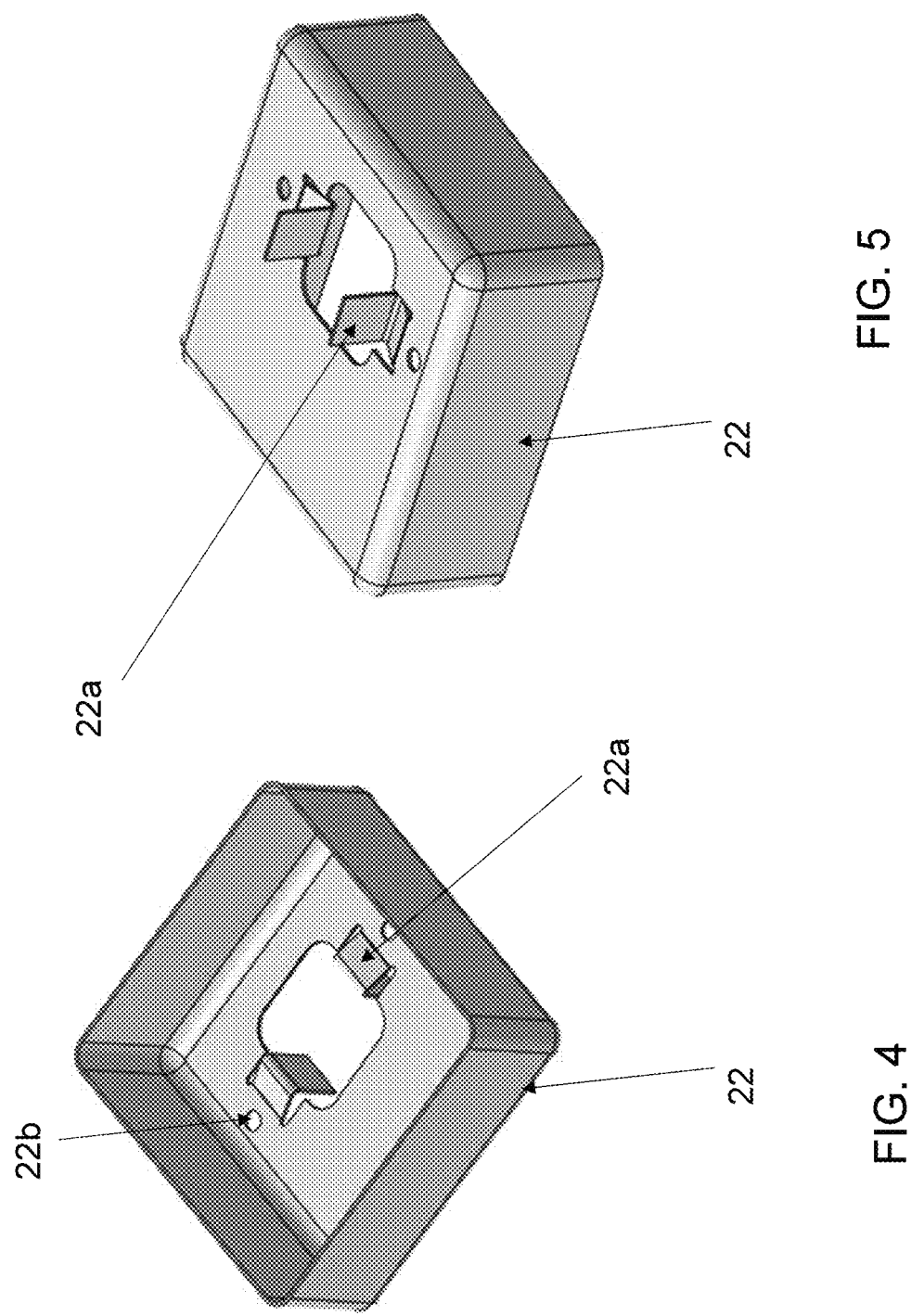

VEHICLE CAMERA WITH EMI SHIELDING

CROSS REFERENCE TO RELATED APPLICATION

The present application claims the filing benefits of U.S. provisional application Ser. No. 62/584,303, filed Nov. 10, 2017, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties. Various cameras are known, such as described in U.S. Pat. Nos. 7,965,336 and/or 8,542,451, which are hereby incorporated herein by reference in their entireties.

SUMMARY OF THE INVENTION

The present invention provides a camera assembly configured for mounting at a vehicle. The camera assembly comprises a camera module or unit (having a lens assembly, imager and circuit element or circuit board and associated circuitry) for mounting at the vehicle. An electrical connector is received at a rear portion of the camera housing and electrically connects with the circuitry of the circuit element for electrically connecting the circuitry to a wiring harness of a vehicle or the like. The camera includes a shield connecting structure that electrically conductively connects a shield element of the camera housing with the connector when the connector is attached at the rear of the camera housing. The camera of the present invention provides enhanced EMI shielding to mitigate radiated or conducted RF interference.

These and other objects, advantages, purposes and features of the present invention will become apparent upon review of the following specification in conjunction with the drawings.

BRIEF DESCRIPTION OF THE DRAWINGS

FIG. 2 is a perspective view of a STP/STQ cable suitable for use with the camera of the present invention;

FIGS. 4 and 5 are perspective views of an enclosure shield of the camera of the present invention;

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
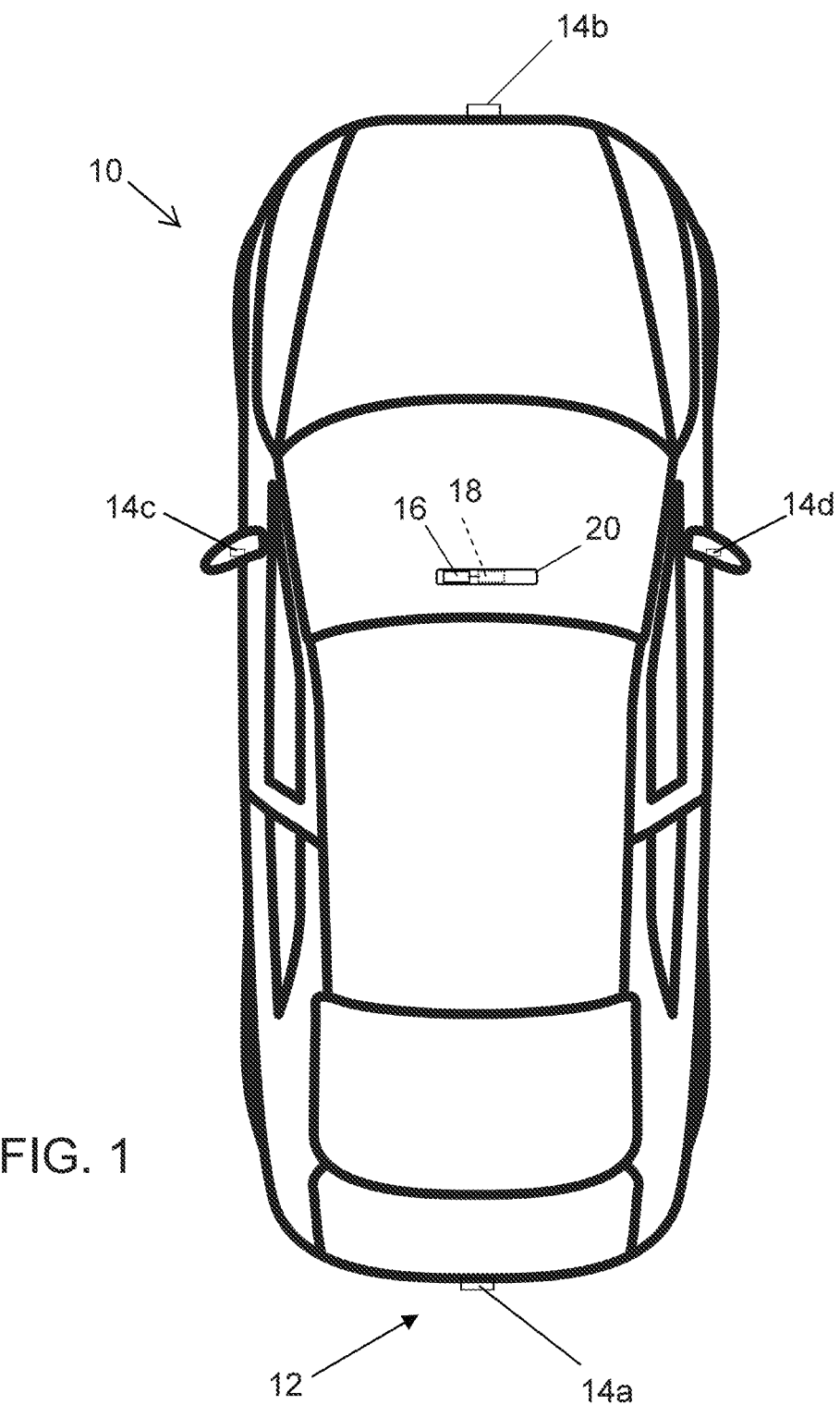
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forward facing camera 14b at the front (or at the windshield) of the vehicle, and a sideward/rearward facing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The camera and its electrical connector may utilize aspects of the cameras and connectors described in U.S. Publication Nos. US-2015-0222795; US-2016-0268716; US-2017-0054881; US-2017-0129419; US-2017-0133811 and/or US-2017-0201661, which are hereby incorporated herein by reference in their entireties. For example, the camera may comprise a front housing portion comprising a lens, and at least one circuit board having an imager disposed at a first side and optically aligned with the lens, and with circuitry disposed at a second side and electrically connected with the imager, and with the circuitry comprising an electrical connecting element at the second side for electrically connecting to an electrical connector. A rear housing portion is configured to join with the front housing portion, and the rear housing portion comprises a rear attachment portion that has an aperture therethrough. The electrical connector is configured for electrically connecting a wire harness of the vehicle to the electrical connecting element of the circuit board. The electrical connector comprises a first connecting end for electrically connecting to the wire harness of the vehicle and a second connecting end for electrically connecting to the electrical connecting element of the circuit board. The electrical connector comprises an attaching portion for attaching at the rear attachment portion of the rear housing portion.

The electrical connector also comprises an electrically conductive element disposed at the attaching portion, with the electrically conductive element being electrically conductively connected to an outer ground contact of the connector. The rear housing portion comprises a shield element having a plurality of tabs that protrude through the aperture at the rear attachment portion.

When the front housing portion is joined with the rear housing portion, the electrical connecting element of the circuit board is aligned with the aperture of the attachment portion and the second connecting end of the electrical connector protrudes through the aperture to electrically connect to the electrical connecting element of the circuit board. As the front housing portion is joined with the rear housing portion, the fingers or tabs of the shield element engage the electrically conductive element and flex, and, when the front housing portion is joined with the rear housing portion, the tabs are biased toward engagement with the electrically conductive element to establish and maintain electrically conductive connection between the shield element and the electrically conductive element and the outer ground contact of the connector, as discussed below.

Figure 3:
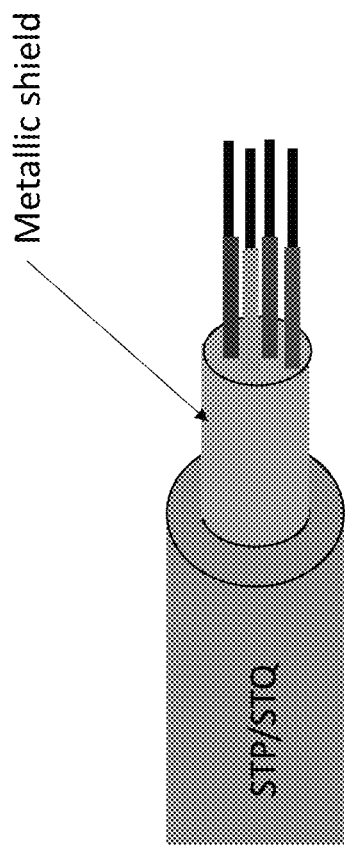

Electromagnetic shielding is an important requirement of digital cameras, both of the coaxial type known as power over coax (POC) where the shield is carried on an outer contact and the signal is carried on an inner contact (see FIG. 2), and the discrete wire type known as Shielded Twisted Pair (STP) or Shielded Twisted Quad (STQ) where the shield is carried on an outer contact and power/signal are carried on 4 inner contacts (see FIG. 3). It is important that a ground path be maintained from the shield of the vehicle cable itself, through the connector on the vehicle wire harness, through the connector at the rear of the camera, through the connector on the camera circuit board, and also surrounding the entire circuit board via the walls of the enclosure. This continuous shield will significantly reduce any radiated or conducted RF interference. The primary benefits of the approach of the present invention are low cost, simplicity of design, minimal effect on the connector welding process, and ability to be carried over to multiple camera types including those where the circuit board is moved to obtain ideal focus and image alignment, and those where the lens is moved to obtain ideal focus and image alignment.

Figure 2:
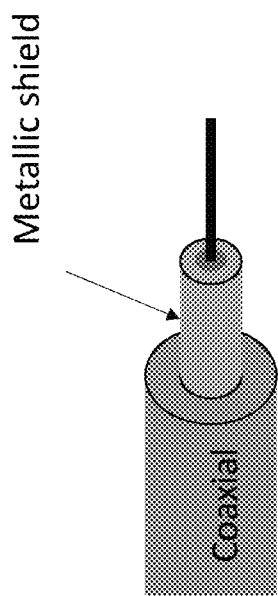
FIG. 2 is a perspective view of a coaxial cable suitable for use with the camera of the present invention.

The camera and connector of the present invention connects the metallic shield of the cable to the camera PCB and the camera housing or enclosure. As shown in FIG. 2, the vehicle wire harness may comprise a coaxial cable, which has a discrete line separated and electrically isolated from the shield by an isolator. Optionally, and such as shown in FIG. 3, the vehicle wire harness may comprise an STP/STQ wire, which has two or more discrete lines separated and electrically isolated from the shield by individual wire jackets. The lines may be twisted as pairs or as quads, and may or may not be individually shielded.

Figure 8:
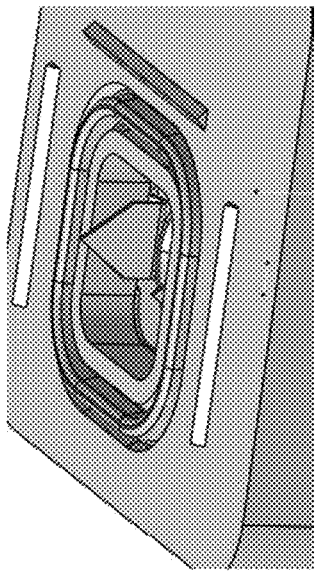
FIG. 8 is a perspective view of another housing and shield construction, showing fingers with pointed ends.

The camera of the present invention includes an enclosure shield 22 (FIGS. 4 and 5), which comprises a metallic shield having bent fingers 22a that make electrical contact with the camera connector ground. In the illustrated embodiment, the enclosure shield 22 comprises a seamless deep-drawn stamping, with the fingers 22a being formed or pre-bent to encourage vertical deflection when compressed with low force, as discussed below. The seamless construction (and thus lack of gaps or openings or seams at the enclosure shield) prevents RF leakage through the enclosure shield. The finger shape is shown in general and may change based on the needs for space or contact surface. For example, the fingers or tabs may have flat ends (as shown in FIGS. 4 and 5) or may have pointed or tapered ends (as shown in FIG. 8), such as for applications where the enclosure shield contacts the connector housing directly. Also, the number of fingers may change to balance the reaction force and/or to increase shielding effectiveness.

Figure 7:
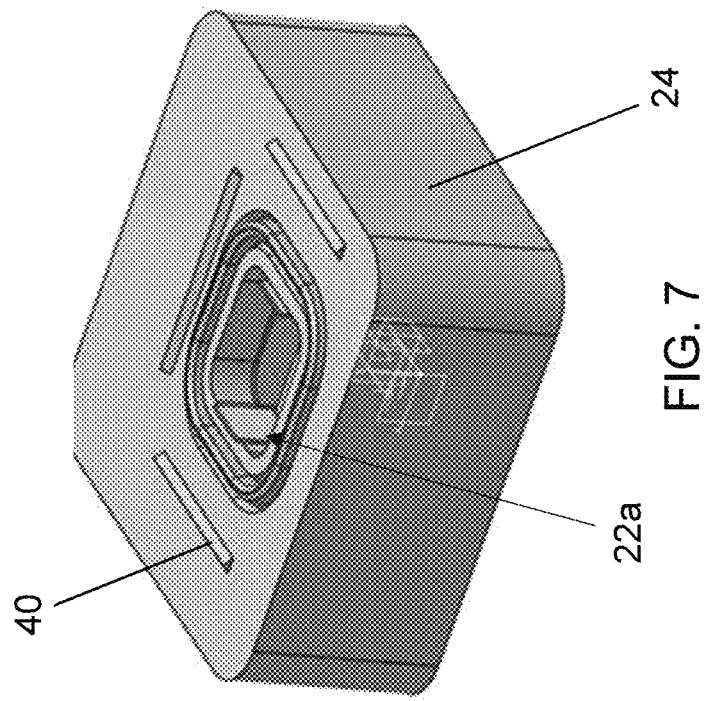
FIGS. 6 and 7 are perspective views of the enclosure shield of FIGS. 4 and 5 disposed at a camera housing or enclosure.
Figure 6:
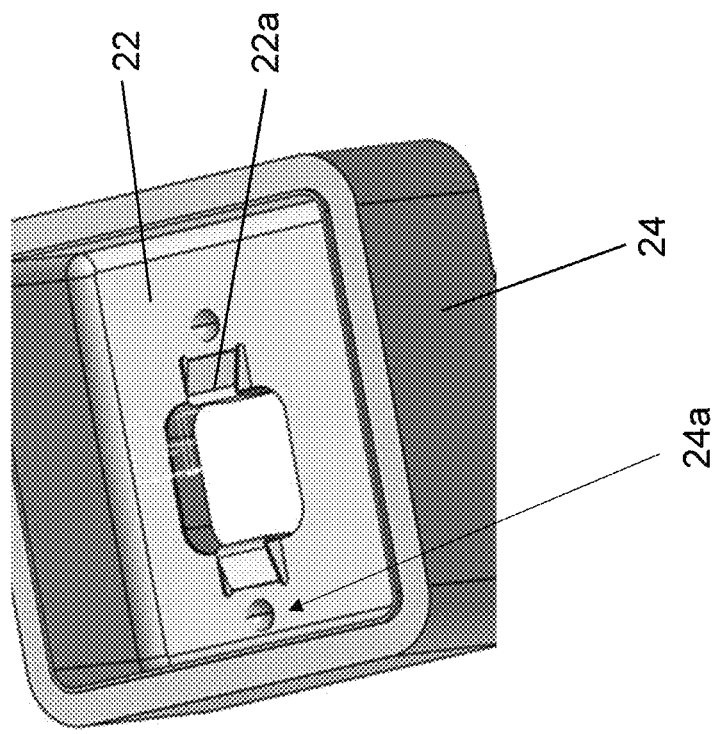

As shown in FIGS. 6 and 7, the enclosure shield 22 is disposed in or pressed into the camera housing or enclosure 24 and fastened with heat stakes 24a. For example, and such as shown in FIG. 6, the plastic housing or enclosure 24 may include plastic posts that are received through apertures 22b (FIGS. 4 and 5) in the metallic enclosure shield and melted over the enclosure shield to retain the enclosure shield relative to the housing or enclosure. When assembled together, and such as shown in FIG. 7, the bent fingers of the enclosure shield are disposed at an aperture of the housing or enclosure and stand proud of the rear surface of the housing or enclosure so the fingers may be engaged by and compressed by the camera connector when it is attached at the enclosure (such as via welding or the like).

Figure 11:
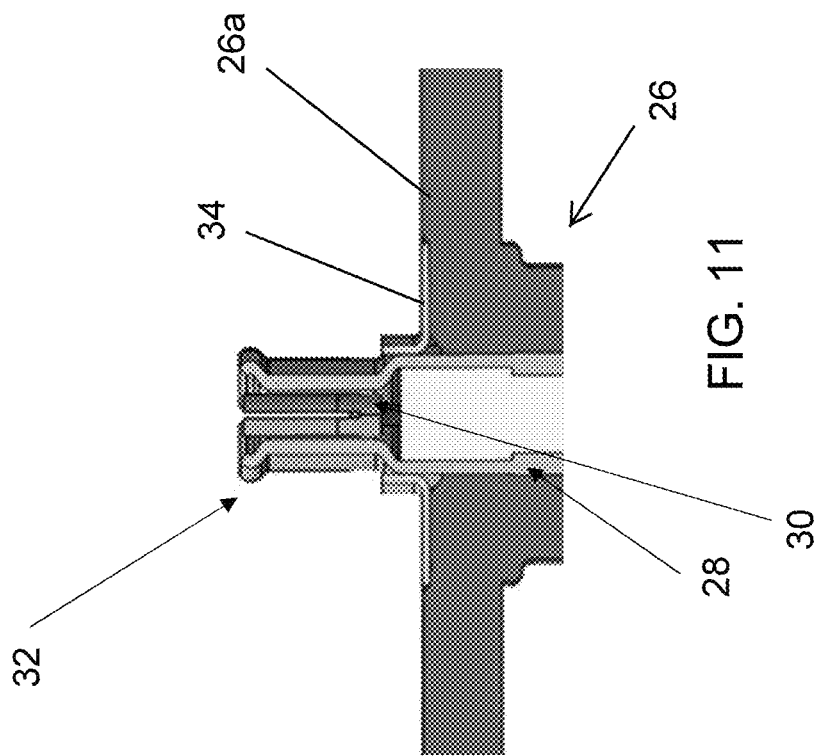
FIG. 11 is a sectional view of the connector.
Figure 9:
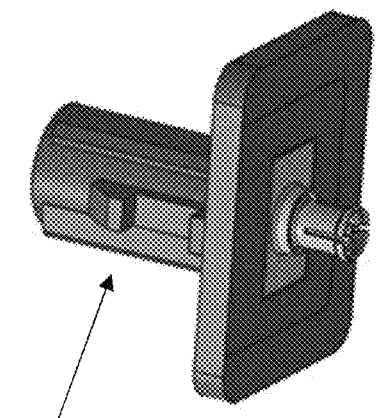
FIG. 9 is a perspective view of a connector of the camera, shown with a formed connector for connecting to a corresponding connector of a vehicle wire harness.
Figure 10:
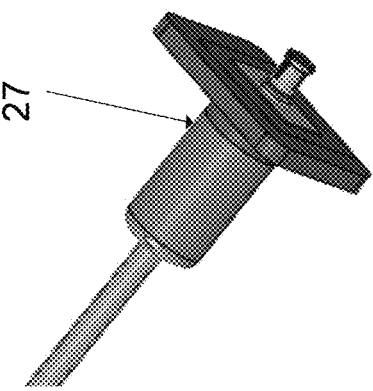
FIG. 10 is a perspective view of another connector for the camera, shown with a cable or wire connecting at a connecting element of the connector.

As shown in FIGS. 9-11, the camera connector 26 may comprise a formed connector portion (FIG. 9) for connecting to a connector of a vehicle wire harness, or the camera connector may have wires or a cable extending therefrom (FIG. 10), with the wire terminating directly at the shield ground outer contact inside a connecting element 27.

As best shown in FIG. 11, the camera connector 26 includes an attaching portion 26a that attaches the connector at the rear of the camera housing or enclosure 24, which receives or includes a shield ground outer contact 28 (that electrically conductively connects to the shield portion of the wire or cable), and signal/power center contact(s) 30 that electrically conductively connect to the one or more discrete lines of the cable or wire (for example, the center contact(s) may comprise a single contact for a POC connector, or two or four contacts for a STP/STQ connector). The camera connector 26 also includes an outer contact 32 that is configured to engage a PCB connector outer contact, which is connected to the PCB ground. The camera connector further includes a metallic flange 34 disposed at the attaching portion 26a and electrically conductively connected to the outer contact 28.

Figure 13:
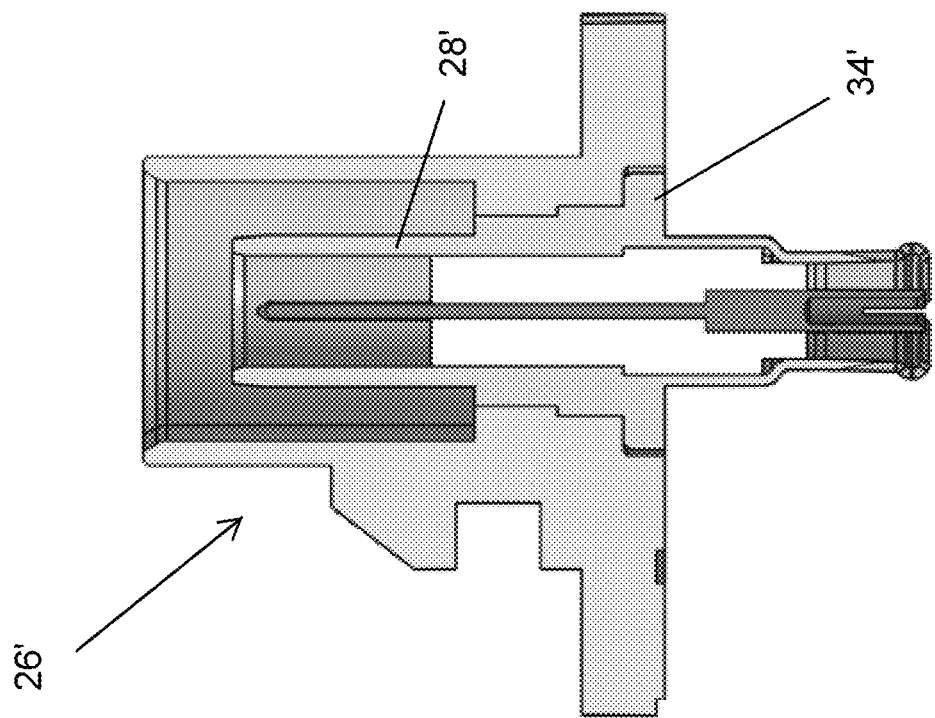
FIG. 13 is a sectional view of the connector of FIG. 12.
Figure 12:
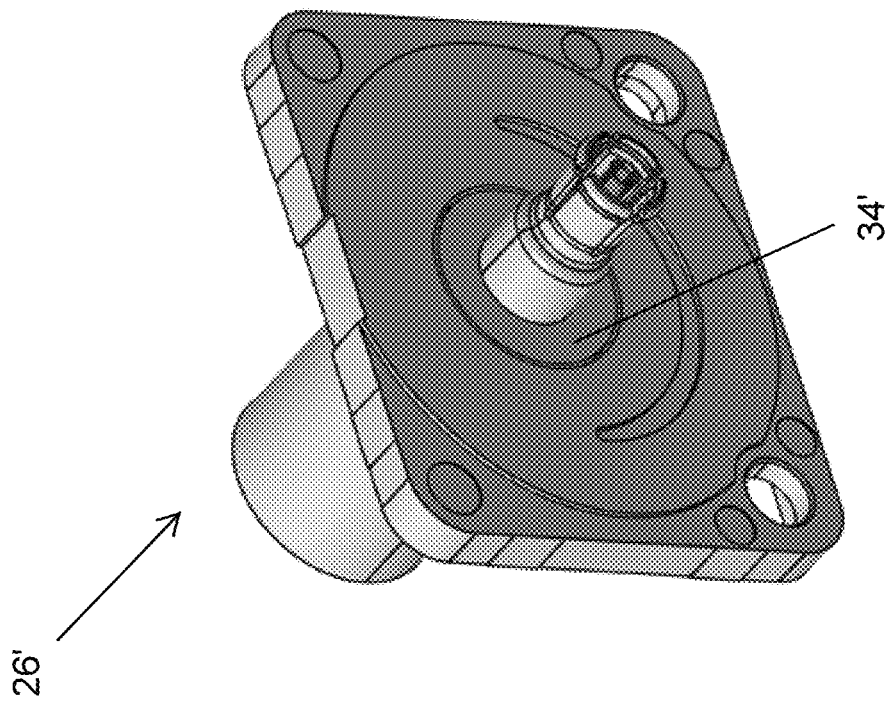
FIG. 12 is a perspective view of another connector for the camera.

The shield ground path continues to the connector by the connector housing, which may be made of a conductive material filled plastic (such as steel, nickel, carbon, graphite, or the like). Optionally, the connector housing may have a metallized coating applied thereto, such as via paint or physical vapor deposition, which makes contact with the shield ground outer contact. Optionally, and such as shown in FIG. 11, a separate small stamping or flange 34 may be pressed to or against the shield ground outer contact 28 so as to be at an inner surface of the attaching portion 26a of the camera connector 26 to provide a location for the shield enclosure fingers 22a to make electrically conductive contact, as discussed below. Optionally, and such as shown in FIGS. 12 and 13, the camera connector 26' may have the outer contact 34' formed as part of the outer contact 28' of the connector portion. Thus, the shield path travels through the outer conductor of the vehicle cable, through the vehicle connector, through the outer contact of the camera connector where it engages the PCB connector, and also is spread to a location where the enclosure fingers may make contact.

Figure 14:
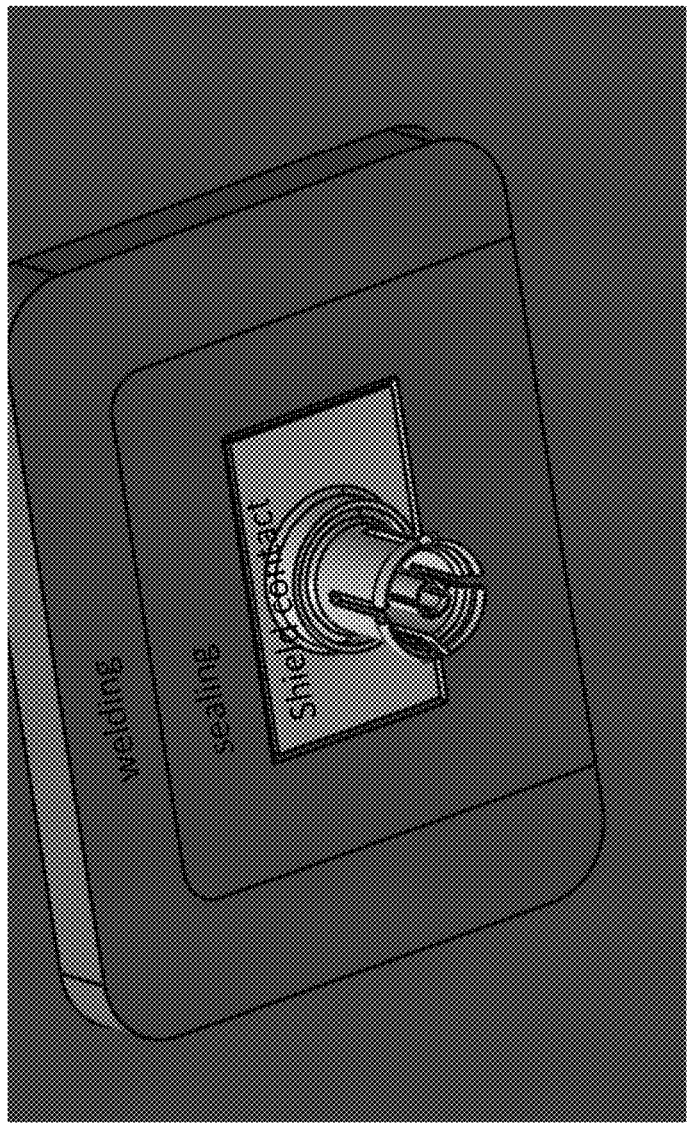
FIG. 14 is a perspective view of the attaching portion of the connector.

As shown in FIG. 14, the underside surfaces of the floating connector 26 have three functional zones. The outside zone or welding zone is configured for attaching or welding the connector to the camera housing or enclosure. The outside zone thus may have a rough texture to speed material melting during the welding operation. The middle zone or sealing zone is configured for sealing the camera connector at the camera housing or enclosure. The middle zone thus may have a smooth texture to ensure a waterproof seal. The inner zone or shield contacting zone is configured to act as the shield ground or contact area. This inner zone or area will be in electrical conductive contact with the ground pin of the connector, and will act as a surface for the ground fingers 22a of the housing shield or enclosure shield 22 to make electrical contact with. The inner zone may be electrically conductive by any suitable means, such as by comprising a plastic resin filled with conductive fillers (e.g., carbon, graphite, steel, or the like), or by comprising a metalized coating, or by comprising an assembled metal stamping. The connector 26 may be conductive only at the inner zone, which may be specifically designated for shield contact, or optionally all surfaces or zones of the connector may be conductive and act as a shield contact (such as discussed below).

Figure 15:
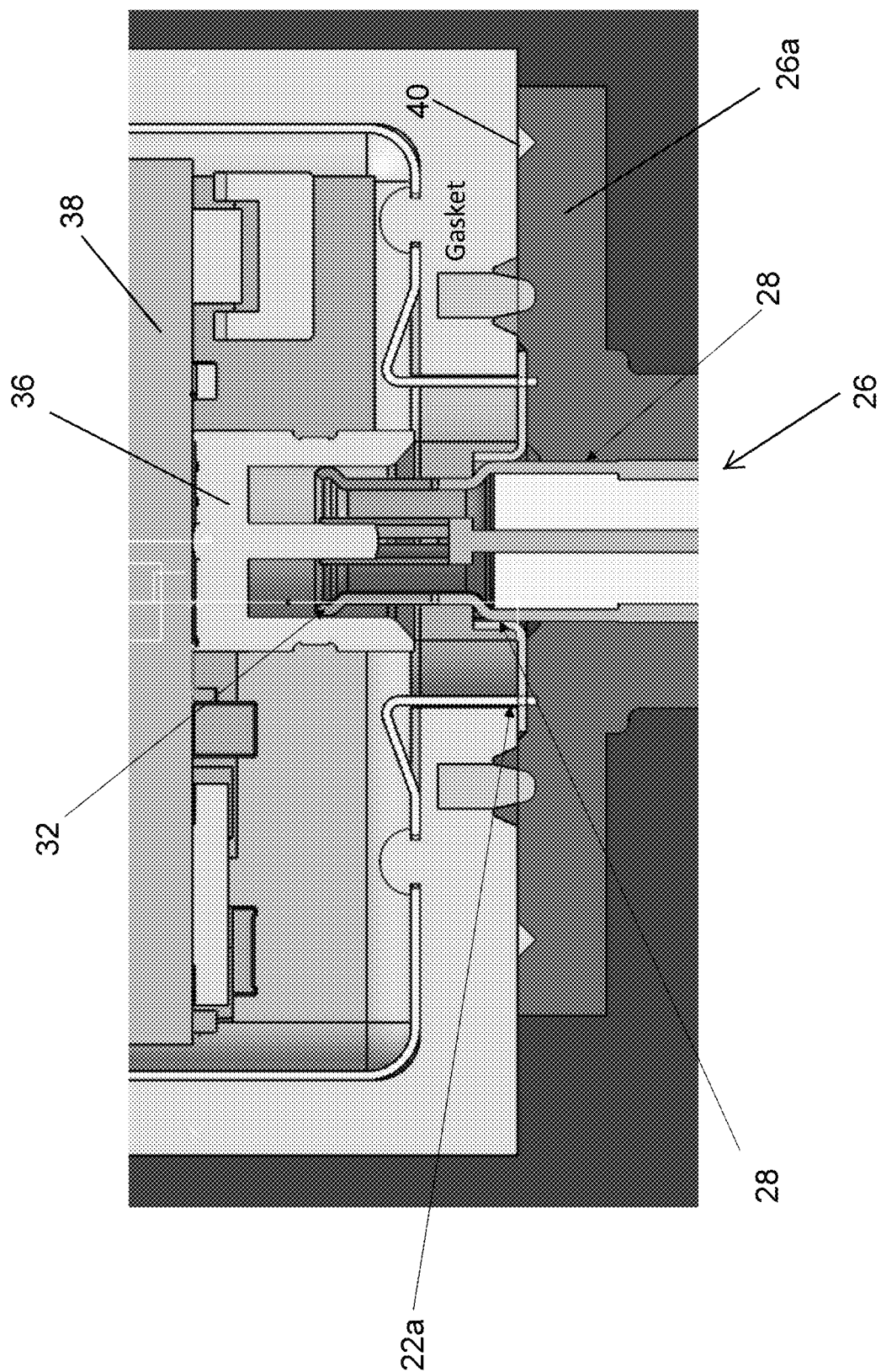
FIG. 15 is a sectional view of the camera, showing the connection of the connector at the PCB connector and the connection of the shield at the connector.

As shown in FIG. 15, when the camera is assembled, the attaching portion 26a of the connector 26 is attached at the rear of the camera housing or enclosure 24, such that the tabs or fingers 22a of the shield enclosure 22 engage and electrically conductively connect to the metallic flange 34 that is electrically conductively connected to the shield ground outer contact 28 of the connector. The shield ground outer contact and the center contacts 30 of the connector electrically connect to a connector 36 at the printed circuit board 38 in the camera.

Thus, the metallic flange 34 provides the contact location for the enclosure shield 22. The enclosure shield fingers 22a flex as they are engaged and are compressed during the connector-to-housing attaching or welding operation. The shield ground outer contact 28 makes electrical contact to the pressed-on stamped flange 34, and the enclosure shield 22 then contacts the stamped flange 34 (via the bent or formed fingers 22a). Optionally, the stamped flange and the shield ground outer contact may comprise a continuous piece of metal.

Optionally, the shield ground outer contact may make electrical contact to the connector housing, such as in applications where the connector housing comprises a metalized coating or electrically conductive plastics. The enclosure shield then may contact the connector housing directly (i.e., no metallic flange would be required). In such an application, it may be beneficial for the fingers 22a to be pointed rather than flat (such as shown in FIG. 8), so that they bite into the plastic attaching portion of the connector when the connector is attached at the rear of the camera housing or enclosure.

Figure 16:
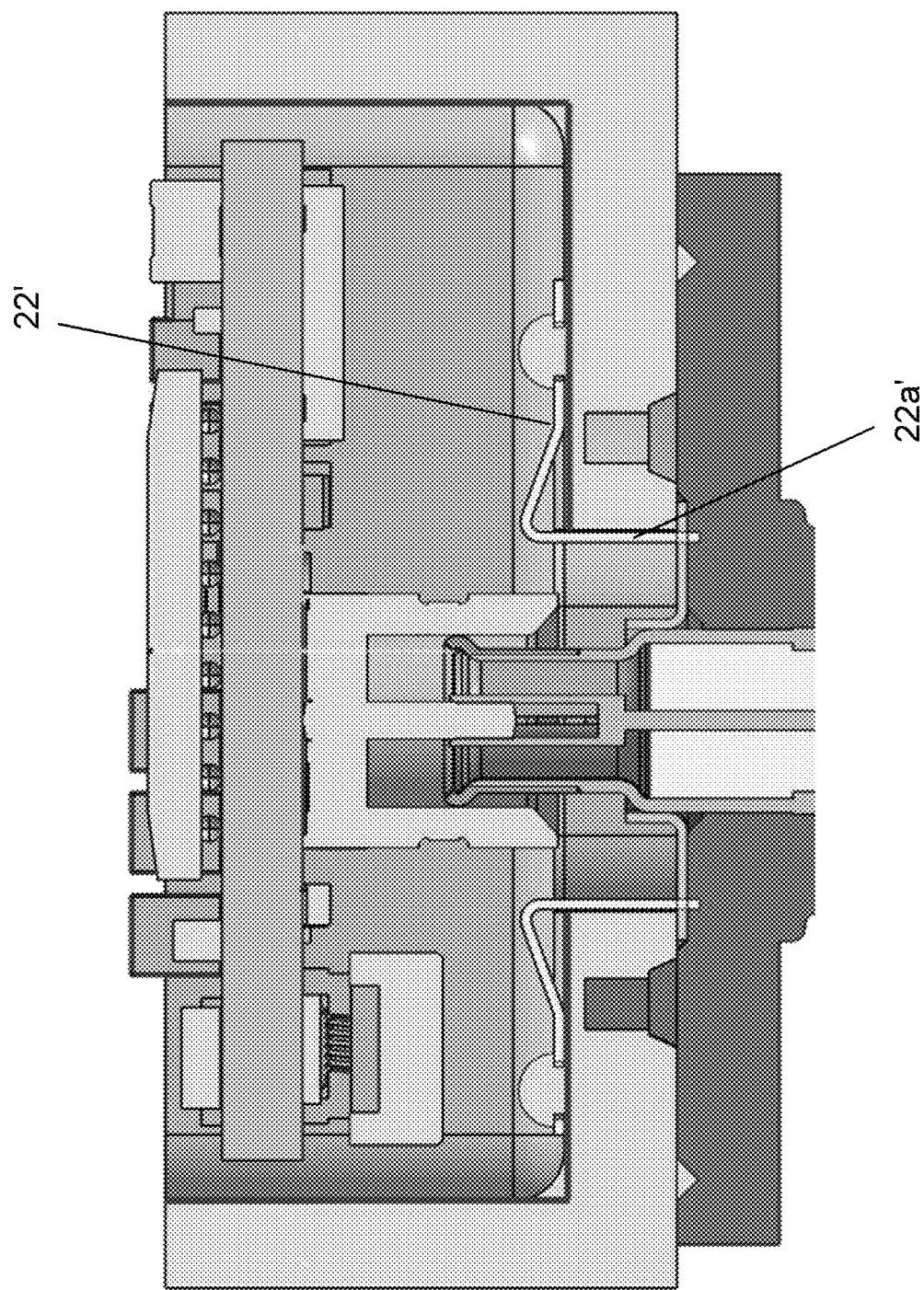
FIG. 16 is a sectional view of another camera, showing a simplified shield element, suitable for use with a metalized or otherwise electrically conductive camera housing.

Optionally, and such as shown in FIG. 16, the enclosure may have a metallized coating, and thus the stamping 22' with fingers 22a' may comprise a smaller and simpler part that electrically conductively connects the metallized coating of the enclosure to the connector housing surface or stamped flange.

Figure 17:
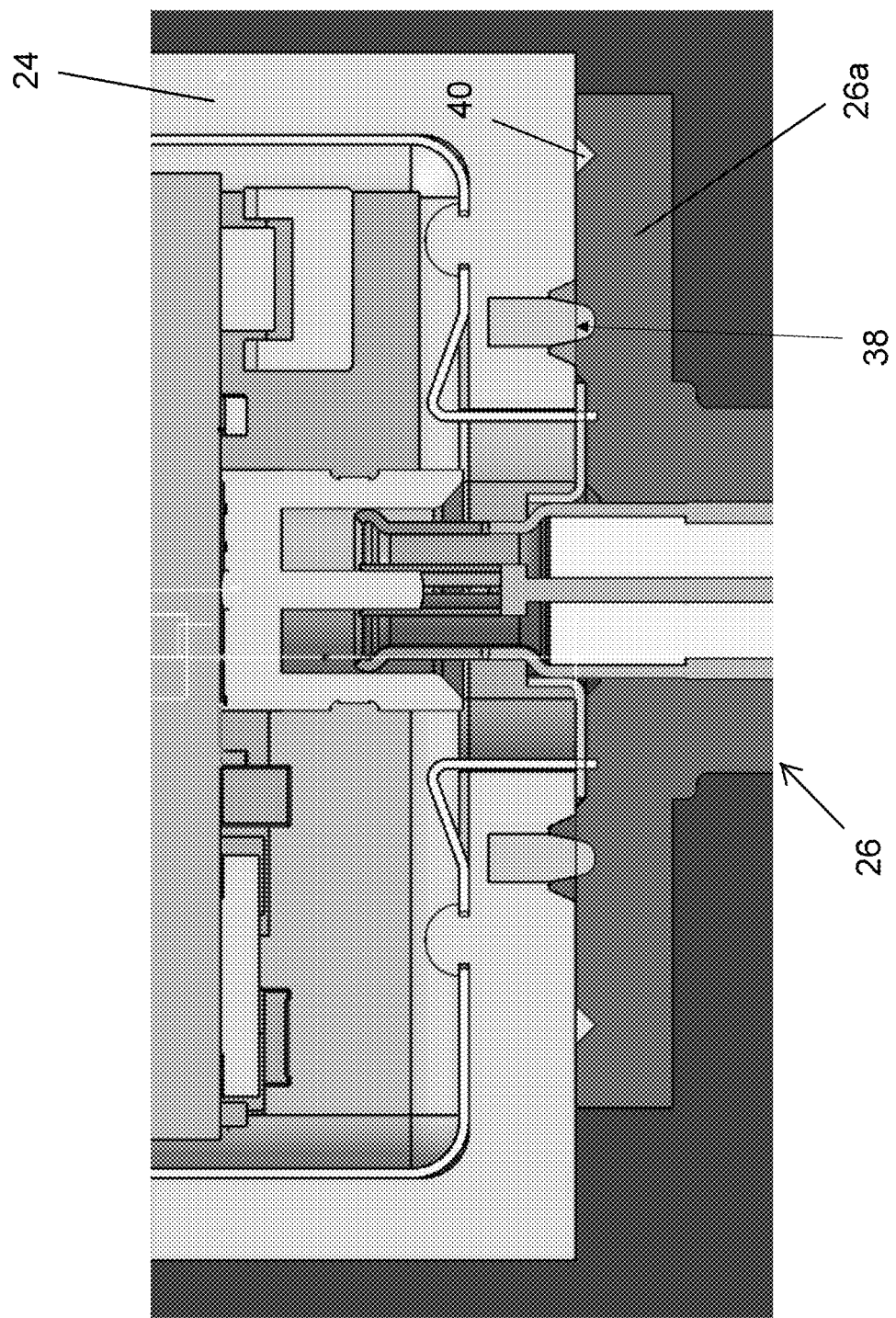
FIG. 17 is a sectional view of another camera, showing electrical conductive connection between the housing and the attaching portion of the connector.

Optionally, and such as shown in FIG. 17, both the enclosure 24 and the connector housing 26 may comprise an electrically conductive plastic or may have a metallized coating. In this case, electrical conductive contact may be made between the attaching portion 26a of the connector 26 and the enclosure 24 by contact through the weld rib 40 and/or through the sealing gasket 42 if the sealing gasket were to be filled with electrically conductive particles.

Figure 18:
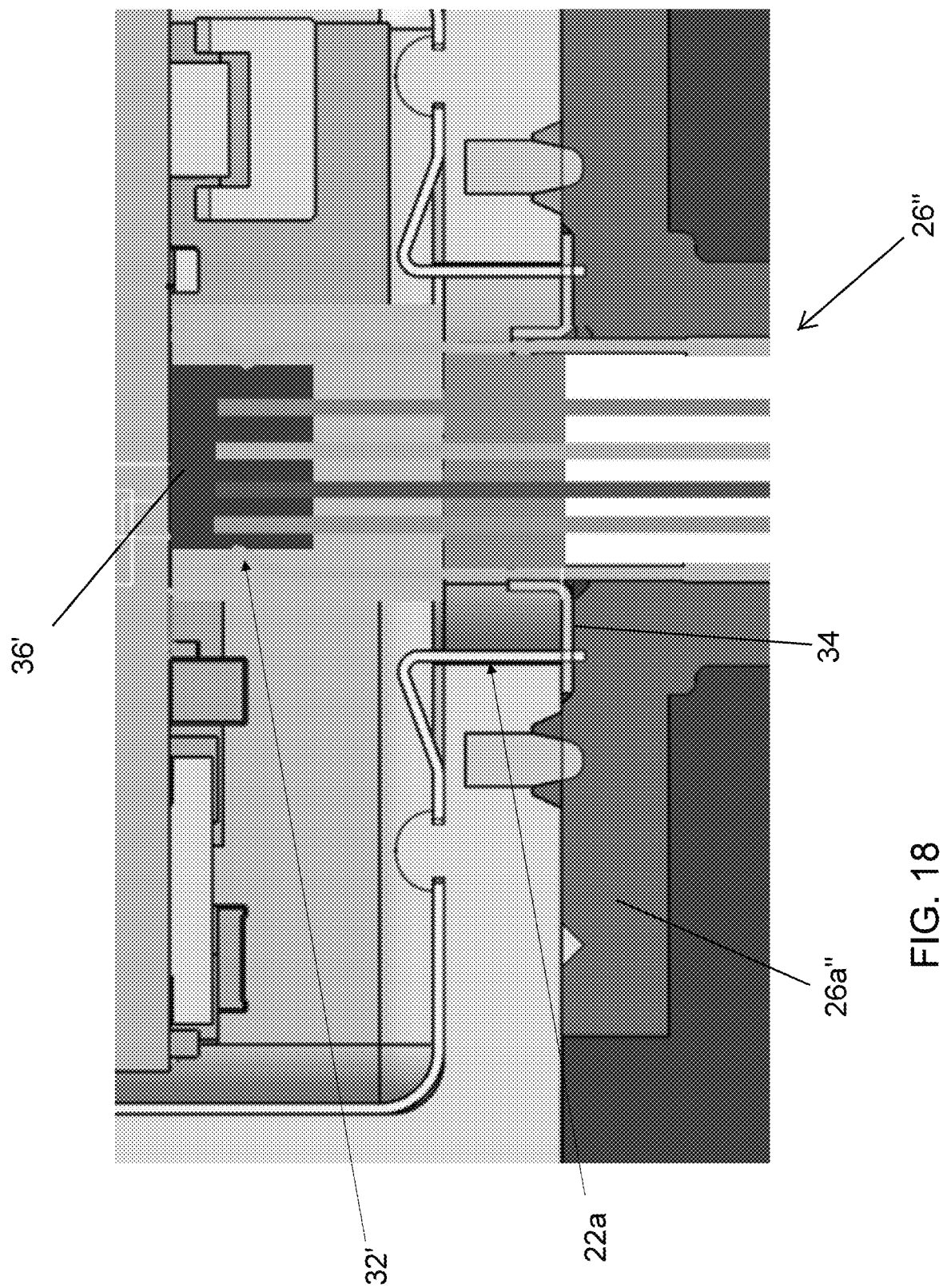
FIG. 18 is a sectional view of another camera, showing the camera with an STP/STQ wiring connector.

Although shown and described above as having a POC type connector, the connector may comprise any suitable type of electrical connection, depending on the particular camera application. For example, and such as shown in FIG. 18, the camera connector 26" (and PCB connector 36') may comprise connectors for STP/STQ wiring having multiple discrete signal/power lines. The PCB connector 36' receives and electrically connects to the discrete lines, and the shield connection (via outer contact 32') to the PCB is made through the metalized outer surface of the PCB connector 26". As shown in FIG. 18, the electrically conductive connection of the shield 22 to the connector 26" may be made via the flexible bent fingers or tabs 22a of the shield engaging and contacting a metallic flange 34 at the attaching portion 26a" of the connector 26", such as in a similar manner as discussed above.

Therefore, the camera and connector of the present invention provides enhanced electrically conductive connection of a shield of a vehicle wire or cable to the enclosure or housing of the camera. The shield comprises a stamped metallic element that is disposed in a camera housing or enclosure and that includes two or more flexible bent fingers or tabs that protrude through an aperture of the camera housing for engaging a metallic (or otherwise electrically conductive) element or flange or portion of an attaching portion of a connector when the connector is attached at the rear of the housing. Thus, as the connector is attached at the housing, the connecting portion of the connector protrudes through the aperture at the rear of the housing to electrically connect to a PCB connector at a printed circuit board of the camera. The attaching portion of the connector is pressed against and attached at the rear of the camera housing, which causes engagement of the metallic flange with the fingers or tabs, which flex and are biased toward such engagement to establish and maintain electrically conductive connection at the flange of the connector.

The camera thus may include electrical connecting elements that accommodate tolerances in the housing and/or PCB mounting and/or connector portion. The electrical connecting elements may utilize aspects of the cameras and electrical connectors described in U.S. Pat. No. 9,233,641 and/or U.S. Publication Nos. US-2013-0242099; US-2014-0373345; US-2015-0222795; US-2015-0266430; US-2015-0365569; US-2016-0037028; US-2016-0268716; US-2017-0133811; US-2017-0295306 and/or US-2017-0302829, which are hereby incorporated herein by reference in their entireties. Optionally, the electrical connections may be established via molded interconnect device (MID) technology, such as by utilizing aspects of the cameras described in U.S. Publication Nos. US-2018-0072239; US-2017-0295306 and/or US-2016-0037028, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ™ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 8,694,224; 7,005,974; 5,760,962; 5,877,897; 5,796,094; 5,949,331; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 7,881,496; 7,720,580; 7,038,577; 6,882,287; 5,929,786 and/or 5,786,772, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Publication No. US-2012-0062743, which are hereby incorporated herein by reference in their entireties.

Optionally, the vision system may include a display for displaying images captured by one or more of the imaging sensors for viewing by the driver of the vehicle while the driver is normally operating the vehicle. Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A camera assembly for a vision system of a vehicle, said camera assembly comprising:

a front housing portion accommodating a lens;

a circuit board having a first side and a second side separated by a thickness of said circuit board, wherein an imager is disposed at said first side of said circuit board and is optically aligned with said lens, and wherein circuitry is disposed at said second side of said circuit board and electrically connected with said imager, and wherein said circuitry comprises an electrical connecting element at said second side of said circuit board;

a rear housing portion configured to join with said front housing portion, wherein said rear housing portion comprises a rear attachment portion that has an aperture therethrough;

an electrical connector for electrically connecting a wire harness of the vehicle to said electrical connecting element of said circuit board, wherein said electrical connector comprises (i) a first connecting end for electrically connecting to the wire harness of the vehicle when said camera assembly is disposed at the vehicle, and (ii) a second connecting end for electrically connecting to said electrical connecting element at said second side of said circuit board, and wherein said electrical connector comprises an attaching portion for attaching at said rear attachment portion of said rear housing portion;

wherein said electrical connector comprises an electrically conductive element disposed at said attaching portion, and wherein said electrically conductive element is electrically conductively connected to an outer ground contact of said electrical connector;

wherein said rear housing portion comprises a shield element having a plurality of tabs that protrude through said aperture at said rear attachment portion and extend outward at an outer side of said rear attachment portion;

wherein, when said front housing portion is joined with said rear housing portion, said electrical connecting element of said circuit board is aligned with said aperture of said attachment portion, and wherein, with said electrical connector attached at the outer side of said rear attachment portion of said rear housing portion, said second connecting end of said electrical connector protrudes through said aperture to electrically connect to said electrical connecting element at said second side of said circuit board; and wherein, as said attaching portion of said electrical connector is attached at the outer side of said rear attachment portion of said rear housing portion, said tabs of said shield element of said rear housing portion engage said electrically conductive element of said electrical connector and flex, and wherein, with said attaching portion of said electrical connector attached at the outer side of said rear attachment portion of said rear housing portion, said tabs are biased toward engagement with said electrically conductive element to establish and maintain electrically conductive connection between said shield element and said electrically conductive element and said outer ground contact of said electrical connector.

2. The camera assembly of claim 1, wherein said outer ground contact of said electrical connector electrically conductively connects at said electrical connecting element of said circuit board.

3. The camera assembly of claim 1, wherein said attaching portion of said electrical connector is attached at said rear attachment portion via welding.

4. The camera assembly of claim 1, comprising a sealing element disposed at said rear attachment portion and circumscribing said aperture to seal against said rear attachment portion and said attaching portion when said attaching portion is attached at said rear attachment portion.

5. The camera assembly of claim 1, wherein said electrically conductive element comprises a metallic element that is press-fit onto said outer ground contact of said electrical connector.

6. The camera assembly of claim 1, wherein said electrically conductive element is formed as part of said outer ground contact of said electrical connector.

7. The camera assembly of claim 1, wherein said shield element comprises a metallic shield element disposed at an inner surface of said rear housing portion.

8. The camera assembly of claim 7, wherein said rear housing portion comprises a plastic injection-molded rear housing portion.

9. The camera assembly of claim 8, wherein, with said metallic shield element disposed at said inner surface of said rear housing portion, said tabs protrude through said aperture at said rear attachment portion so that outer ends of said tabs extend beyond an attaching surface of said rear attachment portion.

10. The camera assembly of claim 1, wherein, when said plurality of tabs comprises two tabs at opposite sides of said aperture.

11. A method of assembling a camera for a vision system of a vehicle, said method comprising:

providing a front housing portion that accommodates a lens;

providing a circuit board having an imager disposed at a first side and circuitry disposed at a second side and electrically connected with the imager, wherein the circuitry comprises an electrical connecting element at the second side of the circuit board;

disposing the circuit board at the front housing portion with the imager optically aligned with the lens;

providing a rear housing portion having a rear attachment portion that has an aperture therethrough;

wherein providing the rear housing portion comprises providing a metallic shield element at an inner side of the rear housing portion with a plurality of tabs of the shield element protruding through the aperture at the rear attachment portion and extending outward at an outer side of the rear attachment portion;

providing an electrical connector for electrically connecting a wire harness of the vehicle to the electrical connecting element of the circuit board, wherein the electrical connector comprises (i) a first connecting end for electrically connecting to the wire harness of the vehicle when the camera is disposed at the vehicle, and (ii) a second connecting end for electrically connecting to the electrical connecting element at the second side of the circuit board;

wherein the electrical connector comprises an attaching portion for attaching at the outer side of the rear attachment portion of the rear housing portion, and wherein the electrical connector comprises an electrically conductive element disposed at the attaching portion, and wherein the electrically conductive element is electrically conductively connected to an outer ground contact of the electrical connector;

joining the front housing portion with the rear housing portion;

wherein joining the front housing portion with the rear housing portion comprises aligning the electrical connecting element of the circuit board with the aperture of the attachment portion;

inserting the second connecting end of the electrical connector through the aperture and attaching the attaching portion of the electrical connector to the rear attachment portion of the rear housing portion;

electrically connecting the second connecting end of the electrical connector to the electrical connecting element at the second side of the circuit board;

wherein attaching the attaching portion of the electrical connector to the rear attachment portion of the rear housing portion comprises engaging the electrically conductive element of the electrical connector with the tabs of the shield element of the rear housing portion and flexing the tabs of the shield element inward; and wherein, after attaching the attaching portion of the electrical connector at the rear attachment portion of the rear housing portion, the flexed tabs are biased outward toward engagement with the electrically conductive element to establish and maintain electrically conductive connection between the shield element and the electrically conductive element and the outer ground contact of the electrical connector.

12. The method of claim 11, wherein the step of attaching the attaching portion of the electrical connector to the rear attachment portion of the rear housing portion is done before joining the front housing portion with the rear housing portion, and wherein the step of electrically connecting the second connecting end of the electrical connector to the electrical connecting element at the second side of the circuit board is done when joining the front housing portion with the rear housing portion.

13. The method of claim 11, wherein electrically connecting the second connecting end of the electrical connector to the electrical connecting element at the second side of the circuit board comprises electrically conductively connecting the outer ground contact of the electrical connector at the electrical connecting element of the circuit board.

14. The method of claim 11, comprising disposing a sealing element at the rear attachment portion and circumscribing the aperture to seal against the rear attachment portion and the attaching portion when the attaching portion is attached at the rear attachment portion.

15. The method of claim 11, wherein providing a rear housing portion comprises providing a plastic injection-molded rear housing portion.

16. A method of assembling a camera for a vision system of a vehicle, said method comprising:
providing a front housing portion that accommodates a lens;
providing a circuit board having an imager disposed at a first side and circuitry disposed at a second side and electrically connected with the imager, wherein the circuitry comprises an electrical connecting element at the second side of the circuit board;
disposing the circuit board at the front housing portion with the imager optically aligned with the lens;
providing a rear housing portion having a rear attachment portion that has an aperture therethrough;
wherein providing the rear housing portion comprises providing a metallic shield element at an inner side of the rear housing portion with a plurality of tabs of the shield element protruding through the aperture at the rear attachment portion and extending outward at an outer side of the rear attachment portion;
providing an electrical connector for electrically connecting a wire harness of the vehicle to the electrical connecting element of the circuit board, wherein the electrical connector comprises (i) a first connecting end for electrically connecting to the wire harness of the vehicle when the camera is disposed at the vehicle, and (ii) a second connecting end for electrically connecting to the electrical connecting element at the second side of the circuit board;
wherein the electrical connector comprises an attaching portion for attaching at the rear attachment portion of the rear housing portion, and wherein the electrical connector comprises an electrically conductive element disposed at the attaching portion, and wherein the electrically conductive element is electrically conductively connected to an outer ground contact of the electrical connector;
joining the front housing portion with the rear housing portion;
wherein joining the front housing portion with the rear housing portion comprises aligning the electrical connecting element of the circuit board with the aperture of the attachment portion;
inserting the second connecting end of the electrical connector through the aperture and attaching the attaching portion of the electrical connector to the rear attachment portion of the rear housing portion;

electrically connecting the second connecting end of the electrical connector to the electrical connecting element at the second side of the circuit board;
wherein attaching the attaching portion of the electrical connector to the rear attachment portion of the rear housing portion comprises engaging the electrically conductive element of the electrical connector with the tabs of the shield element of the rear housing portion and flexing the tabs of the shield element inward;
wherein, after attaching the attaching portion of the electrical connector at the rear attachment portion of the rear housing portion, the flexed tabs are biased outward toward engagement with the electrically conductive element to establish and maintain electrically conductive connection between the shield element and the electrically conductive element and the outer ground contact of the electrical connector; and
wherein the step of attaching the attaching portion of the electrical connector to the rear attachment portion of the rear housing portion is done after joining the front housing portion with the rear housing portion.

17. A method of assembling a camera for a vision system of a vehicle, said method comprising:
providing a front housing portion that accommodates a lens;
providing a circuit board having an imager disposed at a first side and circuitry disposed at a second side and electrically connected with the imager, wherein the circuitry comprises an electrical connecting element at the second side of the circuit board;
disposing the circuit board at the front housing portion with the imager optically aligned with the lens;
providing a rear housing portion having a rear attachment portion that has an aperture therethrough;
wherein providing a rear housing portion comprises providing a plastic injection-molded rear housing portion;
wherein providing the rear housing portion comprises providing a metallic shield element at an inner side of the rear housing portion with a plurality of tabs of the shield element protruding through the aperture at the rear attachment portion and extending outward at an outer side of the rear attachment portion;
providing an electrical connector for electrically connecting a wire harness of the vehicle to the electrical connecting element of the circuit board, wherein the electrical connector comprises (i) a first connecting end for electrically connecting to the wire harness of the vehicle when the camera is disposed at the vehicle, and (ii) a second connecting end for electrically connecting to the electrical connecting element at the second side of the circuit board;
wherein the electrical connector comprises an attaching portion for attaching at the rear attachment portion of the rear housing portion, and wherein the electrical connector comprises an electrically conductive element disposed at the attaching portion, and wherein the electrically conductive element is electrically conductively connected to an outer ground contact of the electrical connector;
joining the front housing portion with the rear housing portion;
wherein joining the front housing portion with the rear housing portion comprises aligning the electrical connecting element of the circuit board with the aperture of the attachment portion;
disposing a sealing element at the outer side of the rear attachment portion and circumscribing the aperture;

inserting the second connecting end of the electrical connector through the aperture and attaching the attaching portion of the electrical connector to the rear attachment portion of the rear housing portion;

electrically connecting the second connecting end of the electrical connector to the electrical connecting element at the second side of the circuit board;

wherein attaching the attaching portion of the electrical connector to the rear attachment portion of the rear housing portion comprises engaging the electrically conductive element of the electrical connector with the tabs of the shield element of the rear housing portion and flexing the tabs of the shield element inward;

wherein attaching the attaching portion of the electrical connector to the rear attachment portion of the rear housing portion comprises compressing the sealing element between the rear attachment portion and the attaching portion of the electrical connector to seal the rear attachment portion and the attaching portion; and wherein, after attaching the attaching portion of the electrical connector at the rear attachment portion of the rear housing portion, the flexed tabs are biased outward toward engagement with the electrically conductive element to establish and maintain electrically conductive connection between the shield element and the electrically conductive element and the outer ground contact of the electrical connector.

18. The method of claim 17, wherein the step of attaching the attaching portion of the electrical connector to the rear attachment portion of the rear housing portion is done before joining the front housing portion with the rear housing portion, and wherein the step of electrically connecting the second connecting end of the electrical connector to the electrical connecting element at the second side of the circuit board is done when joining the front housing portion with the rear housing portion.

19. The method of claim 17, wherein electrically connecting the second connecting end of the electrical connector to the electrical connecting element at the second side of the circuit board comprises electrically conductively connecting the outer ground contact of the electrical connector at the electrical connecting element of the circuit board.

20. A method of assembling a camera for a vision system of a vehicle, said method comprising:

providing a front housing portion that accommodates a lens;

providing a circuit board having an imager disposed at a first side and circuitry disposed at a second side and electrically connected with the imager, wherein the circuitry comprises an electrical connecting element at the second side of the circuit board;

disposing the circuit board at the front housing portion with the imager optically aligned with the lens;

providing a rear housing portion having a rear attachment portion that has an aperture therethrough;

wherein providing a rear housing portion comprises providing a plastic injection-molded rear housing portion;

wherein providing the rear housing portion comprises providing a metallic shield element at an inner side of the rear housing portion with a plurality of tabs of the shield element protruding through the aperture at the rear attachment portion and extending outward at an outer side of the rear attachment portion;

providing an electrical connector for electrically connecting a wire harness of the vehicle to the electrical connecting element of the circuit board, wherein the electrical connector comprises (i) a first connecting end for electrically connecting to the wire harness of the vehicle when the camera is disposed at the vehicle, and (ii) a second connecting end for electrically connecting to the electrical connecting element at the second side of the circuit board;

wherein the electrical connector comprises an attaching portion for attaching at the rear attachment portion of the rear housing portion, and wherein the electrical connector comprises an electrically conductive element disposed at the attaching portion, and wherein the electrically conductive element is electrically conductively connected to an outer ground contact of the electrical connector;

joining the front housing portion with the rear housing portion;

wherein joining the front housing portion with the rear housing portion comprises aligning the electrical connecting element of the circuit board with the aperture of the attachment portion;

disposing a sealing element at the rear attachment portion and circumscribing the aperture;

inserting the second connecting end of the electrical connector through the aperture and attaching the attaching portion of the electrical connector to the rear attachment portion of the rear housing portion;

electrically connecting the second connecting end of the electrical connector to the electrical connecting element at the second side of the circuit board;

wherein attaching the attaching portion of the electrical connector to the rear attachment portion of the rear housing portion comprises engaging the electrically conductive element of the electrical connector with the tabs of the shield element of the rear housing portion and flexing the tabs of the shield element inward;

wherein attaching the attaching portion of the electrical connector to the rear attachment portion of the rear housing portion comprises compressing the sealing element between the rear attachment portion and the attaching portion of the electrical connector to seal the rear attachment portion and the attaching portion;

wherein, after attaching the attaching portion of the electrical connector at the rear attachment portion of the rear housing portion, the flexed tabs are biased outward toward engagement with the electrically conductive element to establish and maintain electrically conductive connection between the shield element and the electrically conductive element and the outer ground contact of the electrical connector; and wherein the step of attaching the attaching portion of the electrical connector to the rear attachment portion of the rear housing portion is done after joining the front housing portion with the rear housing portion.

* * * * *